United States Patent [19]
Ledbetter

[11] Patent Number: 5,623,818
[45] Date of Patent: Apr. 29, 1997

[54] ROTATABLE IN PLACE POWERED VEHICLE FOR STEERING AROUND ABUTMENTS

[76] Inventor: Clyde S. Ledbetter, 116 Amberwood Dr., Shelby, N.C. 28152

[21] Appl. No.: 527,444

[22] Filed: Sep. 13, 1995

[51] Int. Cl.$^6$ ............... A01D 34/64; B62D 7/14
[52] U.S. Cl. ............... 56/15.4; 56/1; 56/10.2 R; 280/99
[58] Field of Search ............... 56/15.4, 10.2 R, 56/DIG. 15; 280/99, 91.1

[56] References Cited

U.S. PATENT DOCUMENTS

| | | | |
|---|---|---|---|
| 3,110,352 | 11/1963 | McClarnon . | |
| 4,483,405 | 11/1984 | Noda et al. | 180/6.5 |
| 4,664,213 | 5/1987 | Lin | 180/212 |
| 4,852,679 | 8/1989 | Fry | 180/234 |
| 4,957,183 | 9/1990 | Mullett et al. | 280/99 X |
| 4,977,733 | 12/1990 | Samejima et al. | 56/14.7 |
| 5,090,512 | 2/1992 | Mullet et al. | 180/236 |
| 5,139,279 | 8/1992 | Roberts | 280/91 |
| 5,259,475 | 11/1993 | Butler | 180/140 |
| 5,288,091 | 2/1994 | Deschamps | 280/99 X |

*Primary Examiner*—Terry Lee Melius
*Attorney, Agent, or Firm*—Laurence R. Brown

[57] ABSTRACT

A rotatable-in-place, powered riding vehicle typically may be used as a lawnmower, garden tractor, wheelchair, or warehouse utility truck. Its simplified construction and operator controls facilitate steering maneuverability. Thus the vehicle can be used in tight working places such as narrow aisles, for turning around at the end of rows, and steering around abutments disposed in the travel path, all in forward drive without requiring a reverse gear transmission. This provides more safety and simpler turning than in vehicles requiring a reverse transmission. Also, the vehicle is simplified, quite inexpensive and requires little maintenance and repair. Thus, the set of wheels pivotably mounted and simple control mechanisms provide optimum pivoting in both forward motion and the rotation-in-place steering functions. Two mutually exclusive modes of operation provide for rotation of the vehicle body about a pivot axis without movement away from the pivot site, and a forward travel mode with conventional steering control active. The only necessary manual vehicle control in addition to a steering wheel and accelerator constitutes a mode selection switch or lever. Thus, when the vehicle reaches an abutment, it is changed from forward to rotary mode in which the steering wheel controls the direction of rotation and the speed of rotation to reorient the vehicle for forward travel mode in a different direction. A preferred hydraulically operated four wheel drive embodiment has traction motors on four wheels. Also the body height above the wheels is adjustable.

23 Claims, 4 Drawing Sheets

ROTATABLE IN PLACE POWERED VEHICLE FOR STEERING AROUND ABUTMENTS

TECHNICAL FIELD

This invention relates to powered utility riding vehicles of the type useful for lawnmowers, gardening, warehouse utility and wheelchairs, and more particularly it relates to vehicles that may be rotated-in-place steering around abutments.

BACKGROUND ART

There have been various proposals in the prior art for the facilitation of steering vehicles around obstacles or in close quarters where it is difficult to maneuver. It is typical of this art to provide all wheel steering in either three or four wheel vehicles, with four wheel vehicles being preferred for stability and balance in such applications as wheelchairs, lawnmowers and warehouse utility vehicles. The all wheel steering feature provides a much smaller turning radius than conventional steering from two front wheels. However any vehicle that must be backed up while steering has a significant disadvantage in that considerable driving skill is required for maneuverability. It is particularly dangerous for unskilled, untrained persons or those with limited coordination such as handicapped persons in wheelchairs to have to drive in reverse. Typically, the driving public is unable to skillfully back up to parallel park in a tight space, for example.

Furthermore even all wheel steered vehicles are inadequate for several types of circumstances that may be encountered, such as with a warehouse utility vehicle that needs to service a narrow aisle where there is no room to back up and turn around. It is always dangerous to drive a vehicle in reverse because the operator cannot have full vision or awareness of the dangers in the travel path. The all wheel steering type of vehicle is similar to conventional steering in that the wheels are turned while the vehicle is moving either forward or reverse. Thus maneuvering in confined spaces constitutes an awkward and tedious jig-jog action for inching a vehicle back and forth into an opposite travel direction.

Typical examples in the vehicle prior art for steering improvements may be found in the following U.S. Pat. Nos.: Samejima, et al., 4,977,733, Dec. 18, 1990; McClarnon, 3,110,352, Nov. 12, 1963; Mullet, 5,090,512, Feb. 25, 1992; Fry, 4,852,679, Aug. 1, 1989; Noda, et al., 4,483,405, Nov. 20, 1984; Lin, 4,664,213, May 12, 1987; Butler, 5,259,475, Nov. 9, 1993; and Roberts, 5,139,279, Aug. 18, 1992.

This invention has the general objective of overcoming deficiencies in steering methods and controls found in the prior art. In particular it is an objective to eliminate those complexities, problems and expenses introduced by mechanical steering linkages accentuating the safety problems encountered when an operator must divert attention unnaturally to the rear of the vehicle in order to drive in reverse.

Further deficiencies are exhibited in this exemplary prior art, including complex and expensive steering mechanisms and systems that are subject to failure, unreliability, high initial cost, critical operating conditions, limited scope of utility and difficulties in maintenance.

Thus, it is a further objective of this invention to provide simple, inexpensive and reliable steering and drive mechanisms for powered utility vehicles adaptable for use in a variety of applications.

Lawnmowing equipment is particularly sensitive to critical operating conditions where grass should be cut evenly without wheel scars or scalping from unbalanced cutter blade sometimes encountered in turnarounds. In common with wheelchair applications, operators riding on the vehicles are endangered if ridden vehicles are unstable and subject to tipping or collision even in the presence of uneven riding surfaces. Lawnmowers are significantly critical since turnaround locations are often encountered at the end of cutting rows near an abutment which are to be avoided, and must be steered around obstacles in their path such as trees.

It is therefore a more specific objective of this invention to produce a riding lawnmowers with simplified construction and superior performance.

DISCLOSURE OF THE INVENTION:

A versatile powered riding vehicle is provided, which has utility as a lawnmower, garden tractor, wheelchair, or warehouse utility vehicle. This vehicle by way of its rotatable-in-place body is functionally advantageous in such applications where maneuvering in small spaces such as narrow aisles is required or where turning at the end of rows in gardening or steering around obstacles such as trees in lawnmowing is involved.

The invention has a particularly advantageous safety feature in providing a vehicle that does not require a reverse gear transmission for backing up, and thus is operable in a forward only drive system which always gives the operator-rider full vision under natural and comfortable driving conditions without distraction or loss of perspective. That feature has other significant advantages such as providing simpler driving tactics when maneuvering in a narrow aisle. Also lawns may be mowed closely to abutments such as walls without scalping or turnaround markings due to tilting or wheel skid marks, etc. Furthermore the improved vehicle steering drive system for the operator has simplified construction to provide a low cost, high reliability vehicle requiring less maintenance.

To achieve these advantages, the vehicle body has a set of wheels pivotably mounted thereon. Simple control mechanisms provide pivoting of the wheels into optimum operating positions for both steering as the vehicle moves forward and for rotation of the body in place in a rotary mode for changing directions as abutments are approached, typically reversing the direction of vehicle travel with the riding operator facing in the direction of travel. In this respect two mutually exclusive modes of operation provide for rotation of the vehicle body about a pivot axis without movement away from the pivot site, and a forward only travel mode with conventional steering control active.

In the preferred embodiment of the invention, the only necessary manual vehicle control in addition to a steering wheel and a conventional accelerator-braking system constitutes a mode selection switch or lever. There is an optional height control available however that may be used to control the height of grass cut by a lawnmower, for example. In this operating mode, when the vehicle reaches an abutment, or otherwise requires a change of travel direction by reaching the end of a row or to avoid an impediment, the mode is changed from forward drive to the rotary mode. In the rotary mode the steering wheel controls both the direction of rotation and the speed of rotation to reorient the vehicle into a new heading for the forward travel mode in a different direction.

A preferred hydraulically operated four wheel drive embodiment has traction drive motors on all four wheels.

This is particularly desirable for maintaining the vehicle body stable and level, and is less likely to produce wheel scars in such lawnmowers. The feature for adjustably selecting body height respective to the wheels may provide lift in a warehouse utility application or in a wheelchair for permitting a rider to enter a car door or step off a ledge or stair step level, for example.

Further objects, features and advantages of the invention will be found throughout the following description, drawings and claims.

BRIEF DESCRIPTION OF THE DRAWINGS

In the accompanying drawings, wherein like reference characters in the various views reflect similar features for facilitating comparison.

THE PREFERRED EMBODIMENT

Figure 1:
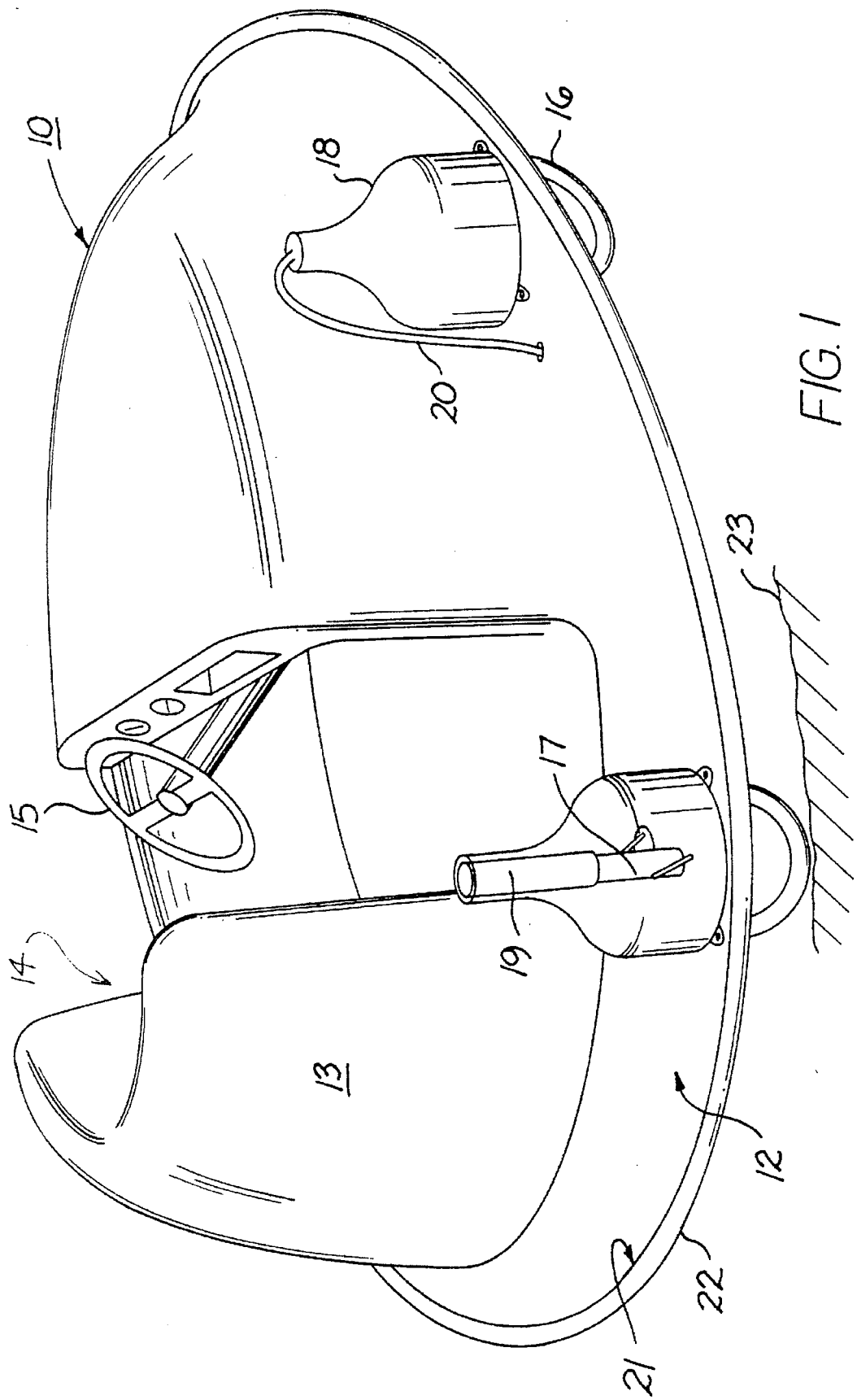
FIG. 1 is a sketch of the round vehicle body with inwardly set wheels, which permits rotation on the spot without any interference when the vehicle is at a spot adjacent to an abutment.

The powered wheeled riding vehicle 10, as seen in FIG. 1, comprises a circular mounting base plate 12 supporting a body 13 with an occupant's seat 14 and a steering wheel 15. The body is propelled by a set of four wheels 16 mounted on pivotable rods 17, which telescope inside the wheel mount hoods 18 for establishing the base 12 to ground surface 23 distance. The telescoping of the wheel pivot rods 17 is controlled by a hydraulic cylinder 19 fed by a hydraulic line 20 for regulating the vertical displacement by vertically positioning the wheels relatively to the plane of the baseplate 12.

Figure 2:
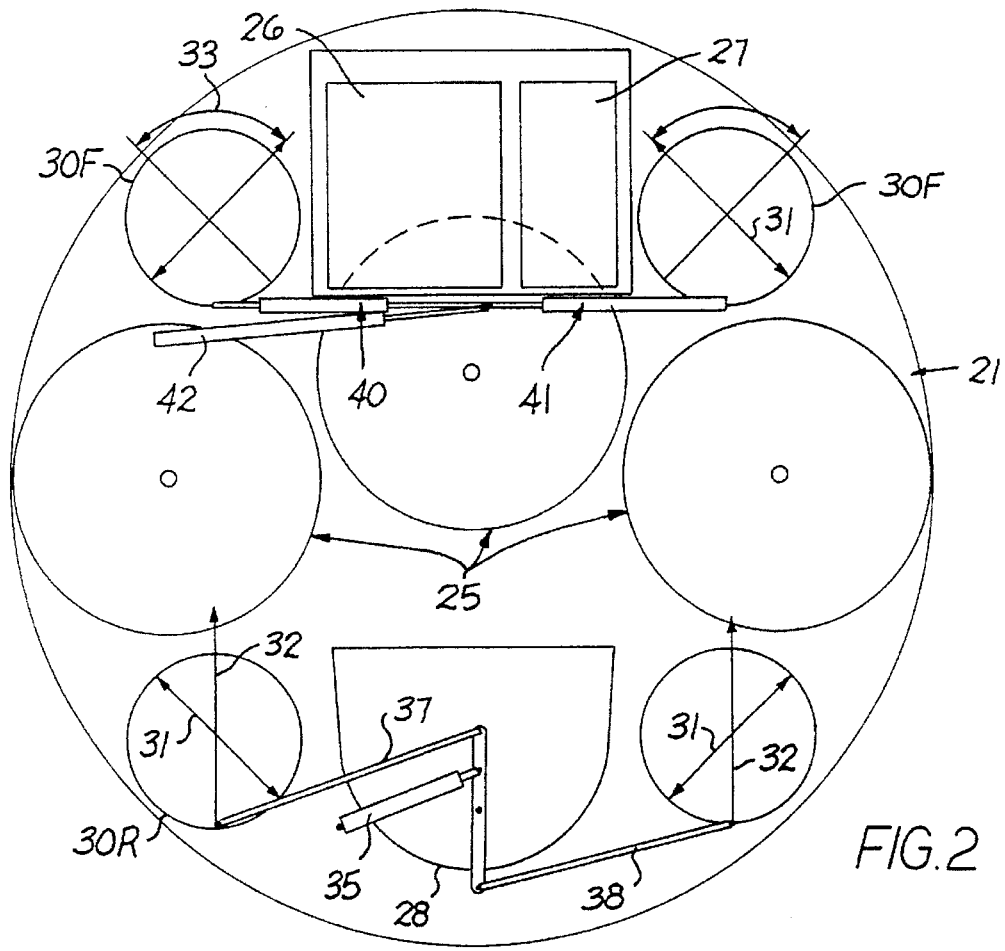
FIG. 2 is a schematic system layout of a lawn mowing embodiment of the invention, looking downwardly at a circular mounting plate or deck.

The circular periphery 21 of the vehicle baseplate 12 may carry a padded bumper 22 of some sort. As shown in FIG. 2, the outer edge 21 is kept free of obstructions, so that the vehicle when driving forward may approach and abut an abutment, and be rotated at that spot by 180 degrees without interference to go forward in the opposite direction, thus eliminating the necessity for a reverse gear and accompanying transmission. Thus, a simplified drive transport or locomotion mechanism unexpectedly improves safety by assuring that the operator-driver has full attention and natural positioning for forward driving at all times the vehicle is travelling. The vehicle is rotated in place for a change of direction with the driver in the seat 12. It is evident that this forward drive mode of operation is a feature permitting advantageous mowing of lawns, when an end of a row or abutment is reached. Also a warehouse utility vehicle that must maneuver in narrow aisles advantageously employs the vehicle.

The three circular sections 25 represent rotary lawn cutters which are driven by the drive engine 26, for example by hydraulic drive motors (not shown) operable from the engine driven hydraulic pump 27. The driver's seat is identified at 28.

In this schematic showing of FIG. 2, the pivotably mounted wheels are shown in the form of the circles 30F (front) and 30R (rear) wheels, which have different modes of operation. As will later be explained in more detail, there are two mutually exclusive modes of operation, namely: (1) a first steering mode for rotary motion of the vehicle body in-situ without engaging traction means for driving the wheels and body in a forward direction and (2) a second steering mode for steering the vehicle conventionally by the two front wheels 30F as the vehicle is moved forward by means of a traction system later described.

In the rotary mode therefore the four wheels 30F and 30R are each aligned in a direction tangentially oriented about a circle of rotation of the vehicle body, as represented by the circular base plate 12. The wheel orientation in this mode is schematically represented by the double headed arrow alignment notation 31. The wheels are held in this orientation by suitable mechanisms such as hydraulic cylinders for locking them in the tangential postures during the rotary mode.

In the forward steering and travel mode, however, the rear wheels 30R are locked into position for forward travel, as indicated by the schematic single headed arrows 32. The front wheels 30F are controlled for steering in tandem to point in the direction set by the steering wheel within the range of the arcs 33. Thus a conventional steering mode for four wheeled vehicles is employed in this mode. However, it is noted that although the preferred embodiment is a four wheel embodiment incorporating four-wheel reversible drive motors, not all four wheels need be driven and a three wheel vehicle could be operable in a tricycle manner, for example.

The hydraulic cylinder 35, thus operates the pivoting lever rod 36 and connecting links 37, 38 in a bistable mode of operation that detents the rear wheels 30R respectively in the forward travel mode and the tangential rotary mode positions. Thus, the cylinder 35 may be simply retracted for forward drive and extended for rotary drive, with appropriate limits stops arranged in the wheel pivot rod system.

The conventional front wheel steering function is achieved by means of the assembly of three hydraulic cylinders 40, 41 and 42. Thus, the cylinders 40 and 41 are connected in a tandem crossbar linkage of the two pivoted front wheels 30F. A single cylinder could similar function. When cylinders 40, 41 are retracted in forward drive position, the wheels are ready for conventional steering. When cylinders 40, 41 are extended, the wheels are pivoted to the tangential rotary position of operation. The steering cylinder 42 coupled by a suitable linkage to the crossbar cylinder assembly 40, 41 therefore in the forward drive position under control of the steering wheel can move back and forth to move the wheels in tandem over the steering range indicated by the arcs 33. It is seen that the hydraulic control assembly is simple, inexpensive and convenient for the purposes intended, as will become even more evident when the control system is hereinafter addressed in more detail.

Figure 3:
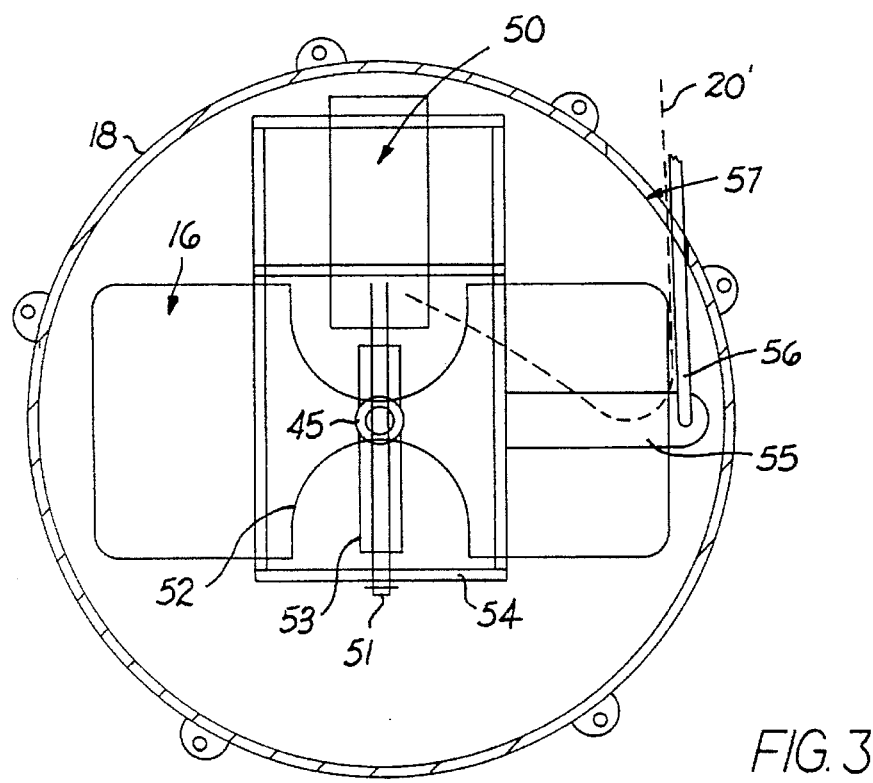
FIGS. 3 and 4 are respectively top and bottom schematic section views of individual pivotable and height-adjustable wheel mounts afforded by this invention.
Figure 4:
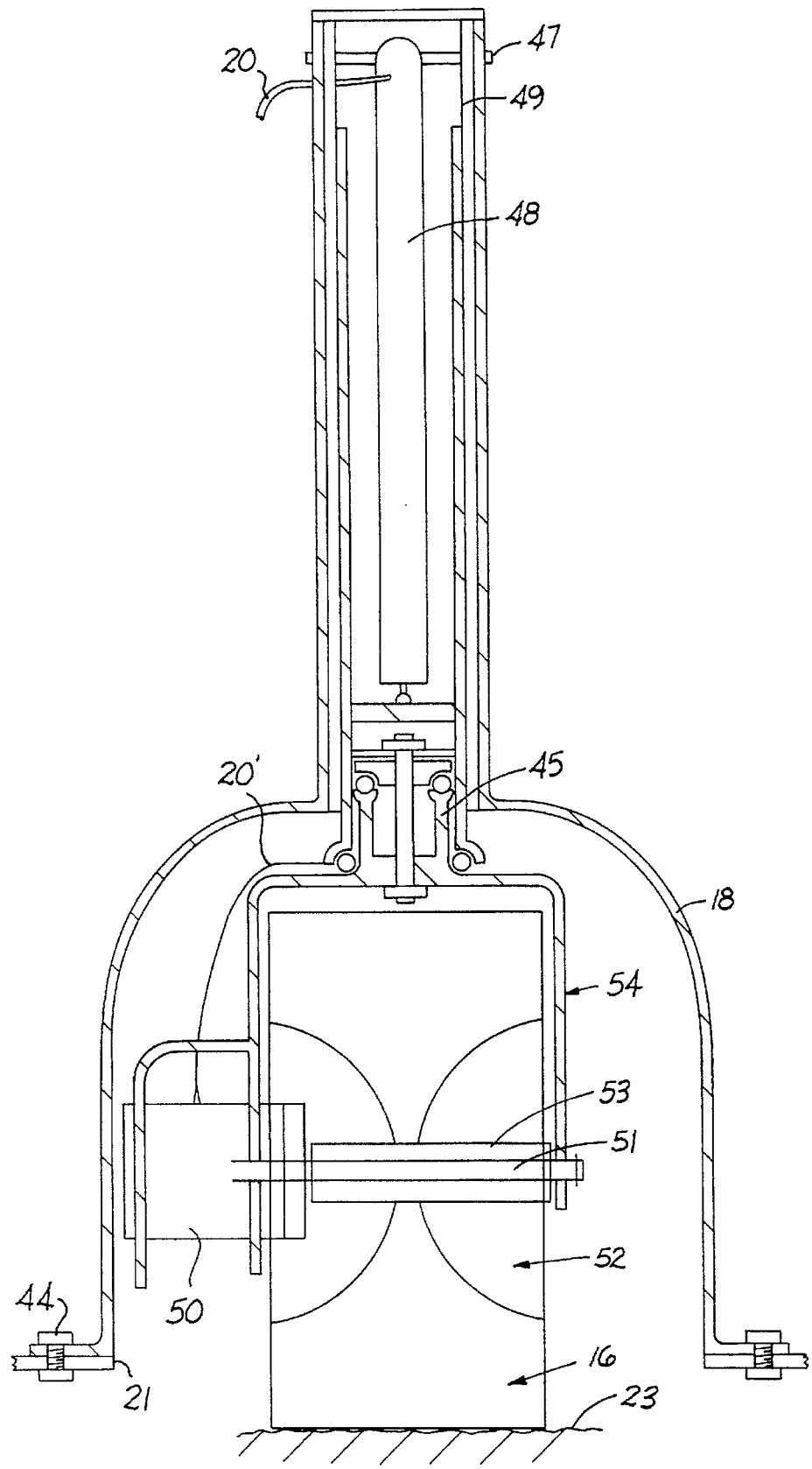

As set forth in FIGS. 3 and 4, the wheel mounting hood 18 is mounted by bolts 44 to the baseplate 21 at four positions about the periphery. The wheels 16 are pivoted about a vertical axis at bearing assembly 45 rotatable within the vertically oriented cylinder 46, pinned at pin 47 commonly to the housing 18 and sleeve 49 to the hydraulic lift cylinder 48 for achieving the aforesaid pivoting functions in the steering and rotation modes and the auxiliary lift function. Thus the cylinder 46 vertically moves within sleeve 49 under control of the hydraulic cylinder 48 to change the vertical distance between the traction tire surface at the travel surface 23 and the vertical level of the body plate 21.

The hydraulic traction drive motor 50 rotates the wheels about axle 51 for traction drive in both the rotation and forward drive modes. The reversible motor 50 thus serves to rotate the vehicle body in place in either clockwise or counterclockwise directions.

The tires 16 are mounted in the rim assembly 52 attached to hub 53. The wheel assemblies mounted in the fork 54 are pivoted by means of steering arm 55 and connecting link 56 (FIG. 3) attached for displacement by the respective steering control system heretofore discussed. This is permitted by the circumferential slot 57 in the side of the housing 18 bell. The flexible hydraulic cable 20' providing hydraulic fluid to motor 50 may be strapped to the link 56 and steering arm 55.

Figure 5:
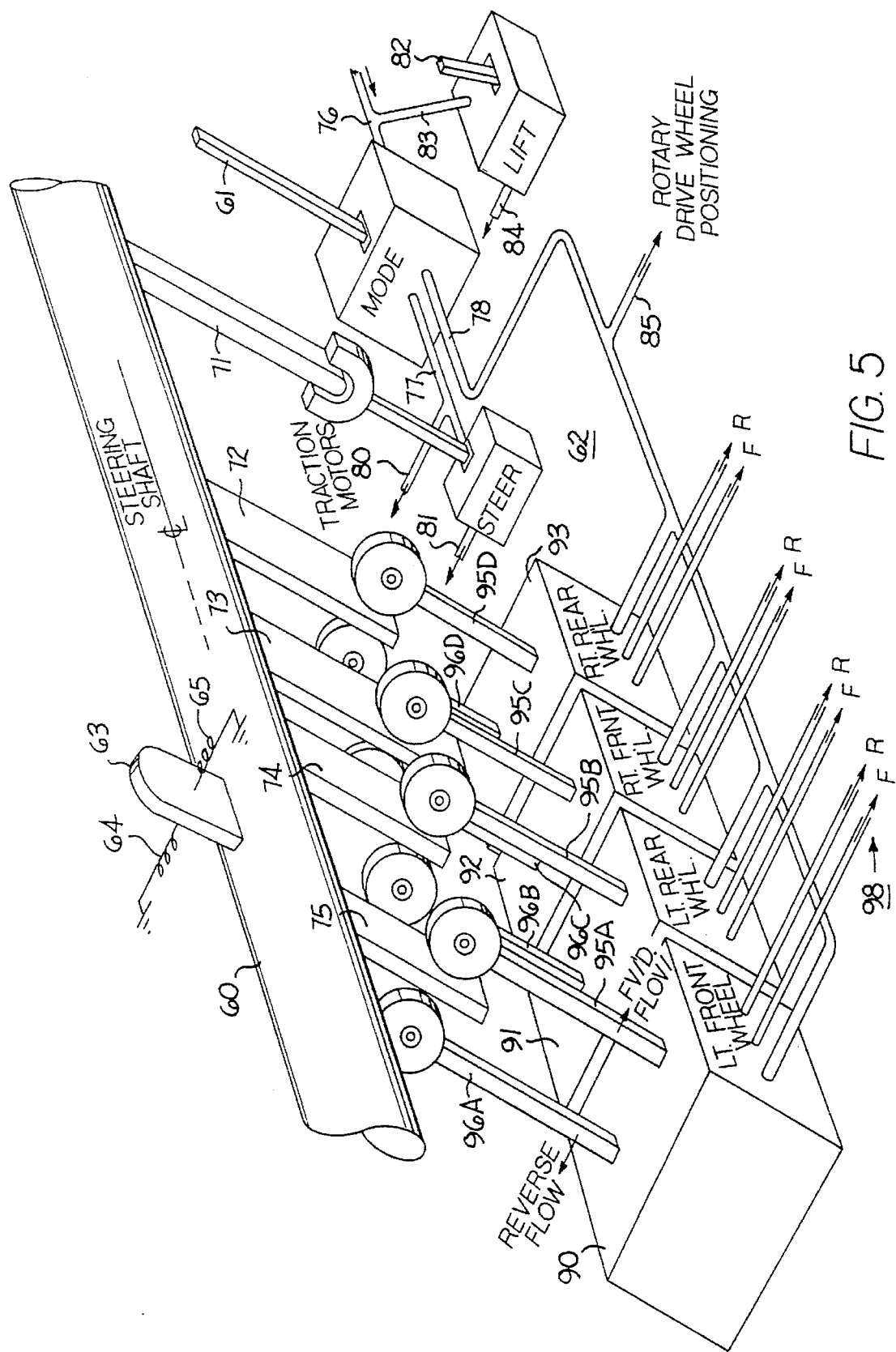
FIG. 5 is a three dimensional perspective schematic control diagram of the preferred hydraulically actuated embodiment of the invention.

The hydraulic control system schematically set forth in FIG. 5, is manually controlled by the steering wheel shaft 60 and the mode shift lever 61 through the various hydraulic valves shown in the respective three dimensional blocks, located in a valve chamber generally indicated at 62. The steering wheel is turned through an appropriate steering arc about the centered default position maintained by tab 63 and springs 64, 65. This default position defines the straight forward direction from which appropriate steering control from the shaft 60 diverts the direction of the vehicle.

A set of control cams 71 to 75 rotate with the steering shaft 60 for actuating different hydraulic valves in the respective modes set by the mode control lever 61 to divert the incoming hydraulic fluid under pressure at input line 76 mutually exclusively into one of two output lines 77, 78. Thus, the motors on all four wheels, by way of line 80 are powered for traction in the forward driving mode through a suitable manually operable accelerator for controlling driving speed (not shown). In this mode the steering control cam 71 controls the hydraulic fluid at line 81 for control of the steering control hydraulic cylinder (42, FIG. 2) in the normal manner of steering wheel control. Thus, the wheels are moved from center default in opposite directions through steering cam 71 as it moves toward opposite sides of the neutrally biased default position.

The lift cylinder (48, FIG. 4) is controlled by manual control member 82, independently of the operating mode selection from input hydraulic line 83 to command output line 84 for positioning of the lift cylinder to establish the appropriate level of the housing.

In the rotary mode, hydraulic line 78 is activated and branch 85 actuates the wheel positioning cylinders. (33, 40, 41, FIG. 2) to pivot the wheels into their tangential position for rotation of the body in-situ. Also the traction drive motor valves 90–93 establish the reversible wheel rotation motor direction (F-R) and also the traction motor speed in response to the cams 72–75 operated with rotation of the steering wheel shaft 60. Thus, the respective forward flow valves 95A–95D are opened for rotation of the motors to rotate the vehicle body clockwise and reverse flow valves 96A–96D are opened for rotation of the vehicle body in the counterclockwise direction. The respective lines 98 thus lead to the forward and reverse drive ports on the respective four wheel drive motors. As the steering shaft 60 rotates over about 40 degrees from the center default position, the reverse flow or forward flow valves for the four wheels correspondingly control the body rotation direction and speed.

In this manner it is seen that this simplified control system, be it electric, hydraulic or mechanical, operates in the two modes respectively providing for (1) traction movement forward with conventional steering and (2) variable speed body rotation in place, under manual control of the steering wheel and mode selection switching device.

Having therefore advanced the state of the art, those features of novelty exhibiting the spirit and nature of the invention are set forth with particularity in the following claims.

I claim:

1. A powered wheeled vehicle comprising in combination:
   a vehicle body supported on wheels,
   wheel traction drive means for rotating at least some of the wheels for moving the vehicle in a forward direction, and
   steering means for orienting a set of steering wheels designated from said wheels for steering in two mutually exclusive modes of steering operation, namely a first steering mode for rotary in-situ motion of the vehicle body at an in-situ rotation site with the set of steering wheels without vehicle motion away from said in-situ rotation site, and a second steering mode for steering the vehicle by movement of a subset of less than all of the steering wheels in said set with the traction drive means engaged for forward motion, whereby the vehicle can be driven in the second steering mode into engagement with an abutment, whereat the first steering mode is employed for rotating the body in-situ to direct the vehicle for moving away from the abutment thereby for reengaging the second steering mode for moving the vehicle away from abutment.

2. The vehicle of claim 1 wherein the wheel drive means further comprises traction drive motors for at least a portion of the wheels.

3. The vehicle of claim 2 wherein the traction drive motors are hydraulic motors.

4. The vehicle of claim 3 further comprising:
   wheel mounting means rotatably mounting the wheels to turn about a vertical axis, and hydraulic means for rotating the wheels into respective directions in said two steering modes.

5. The vehicle of claim 2 further comprising a set of at least three wheels and manual controls for controlling motor speed for driving the vehicle at variable speeds.

6. The vehicle of claim 1 wherein the steering means further comprises a steering wheel, reversible traction drive motors, and a linkage between the steering wheel and said reversible drive motors for driving the motors in different directions with rotation of the steering wheel in opposite directions.

7. The vehicle of claim 1 wherein the steering means further comprises a wheel housing mounted on the vehicle body for pivoting the wheels in said set about a vertical axis, and control means for establishing said first steering mode by orienting the wheels at an angle about the vertical axis to rotate for traction in a direction tangentially oriented about a circle of rotation of the vehicle body.

8. The vehicle of claim 7 further comprising reversible traction drive motors for the wheels of said set, a steering wheel, means for returning the steering wheel to a default neutral position, and traction control means operable only in the first steering mode for accelerating the traction drive motors for traction in a direction that the steering wheel is turned away from the neutral position.

9. The vehicle of claim 1 wherein the steering means further comprises a wheel housing mounted on the vehicle body for rotating the wheels in said set about a vertical axis, and control means for establishing said second steering mode by orienting the wheels at an angle about the vertical axis to rotate for traction in a forward locomotion direction for the vehicle.

10. The vehicle of claim 9 further comprising steering control means for pivoting at least one wheel about the vertical axis to change the forward locomotion direction of the vehicle.

11. The vehicle of claim 1 further comprising rotary wheel mounts for pivoting the wheels about a vertical axis.

12. The vehicle of claim 1 further comprising vertical displacement means for regulating the relative vertical positioning of the vehicle body and the wheels.

13. The vehicle of claim 1 further comprising rotary grass cutting means carried by the vehicle.

14. The vehicle of claim 1 wherein the vehicle body further comprises a circular platform.

15. The vehicle of claim 1 further comprising an operator seat located upon said body.

16. The vehicle of claim 1 further comprising a hydraulic generator, and hydraulically controlled cylinders for establishing the direction for wheel traction in said two steering modes.

17. The vehicle of claim 1 wherein the traction drive means constitutes means for moving the vehicle in a forward direction only.

18. A rotatable in place powered riding vehicle comprising in combination:

a vehicle body with a set of steering wheels pivotably mounted thereon for steering of the vehicle;

driving control means comprising body rotation means, locomotion means and means for steering the path of travel of the vehicle body during locomotion;

said locomotion means comprising powered traction means for turning at least one wheel to move the vehicle body along a forward direction of travel;

said body rotation means comprising means for pivoting all the wheels of said set of steering wheels for wheel rotation into a tangential orientation about a circle defining a body pivot axis and means for operating the locomotion means to turn the wheels of said set of steering wheels for rotation of the vehicle body with the vehicle body resident in-situ at a pivot axis site; and said steering means further comprising means for pivotably rotating a subset of less than all the wheels in said set of steering wheels to steer the direction of forward travel of the vehicle.

19. The vehicle of claim 18 characterized in that the vehicle locomotion means drives the vehicle only in a forward direction of vehicle travel.

20. A wheeled powered lawn mowing vehicle, comprising in combination, a set of steering wheels a vehicle housing with a circular periphery defining an axis of rotation, steering means for placing all of said set of steering wheels into a mode of operation for rotating said vehicle in-situ concentrically about the axis of said circular periphery, whereby when the circular housing periphery of the vehicle is driven into an abutment, the vehicle can rotate in-situ around said axis to direct the vehicle away from the abutment.

21. The vehicle of claim 20, further comprising steering means employed when moving the vehicle from the in-situ place that directionally orients a subset of less than all of the set of steering wheels.

22. The vehicle of claim 20, further comprising bistable mode steering means providing for positioning the wheels respectively (a) in a first mode for rotation of the vehicle in place, and (b) in a second mode for movement of the vehicle from place to place.

23. The vehicle of claim 20, characterized in that the vehicle comprises locomotion means that drives the vehicle only in a forward direction of travel.

* * * * *